United States Patent Office.

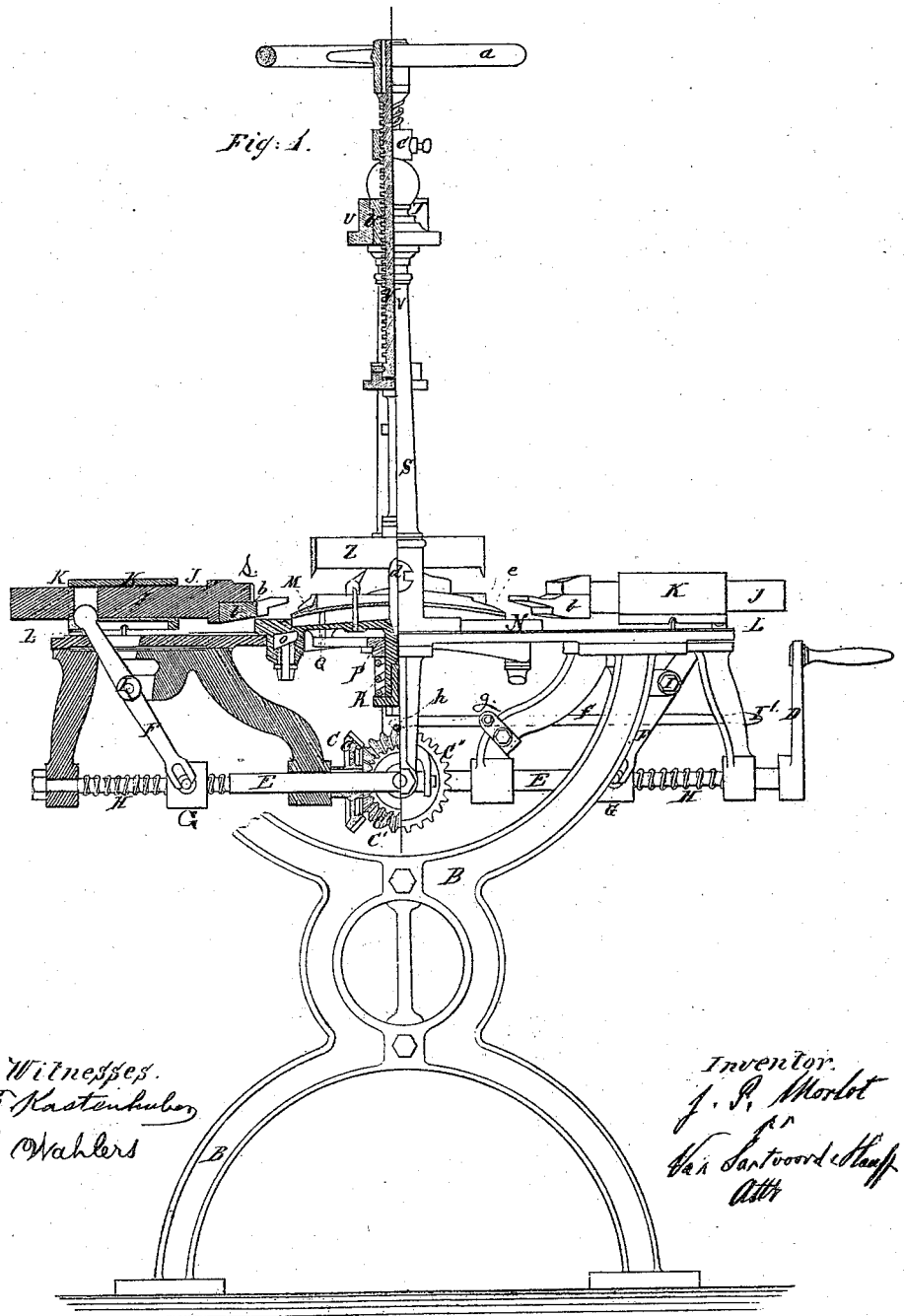

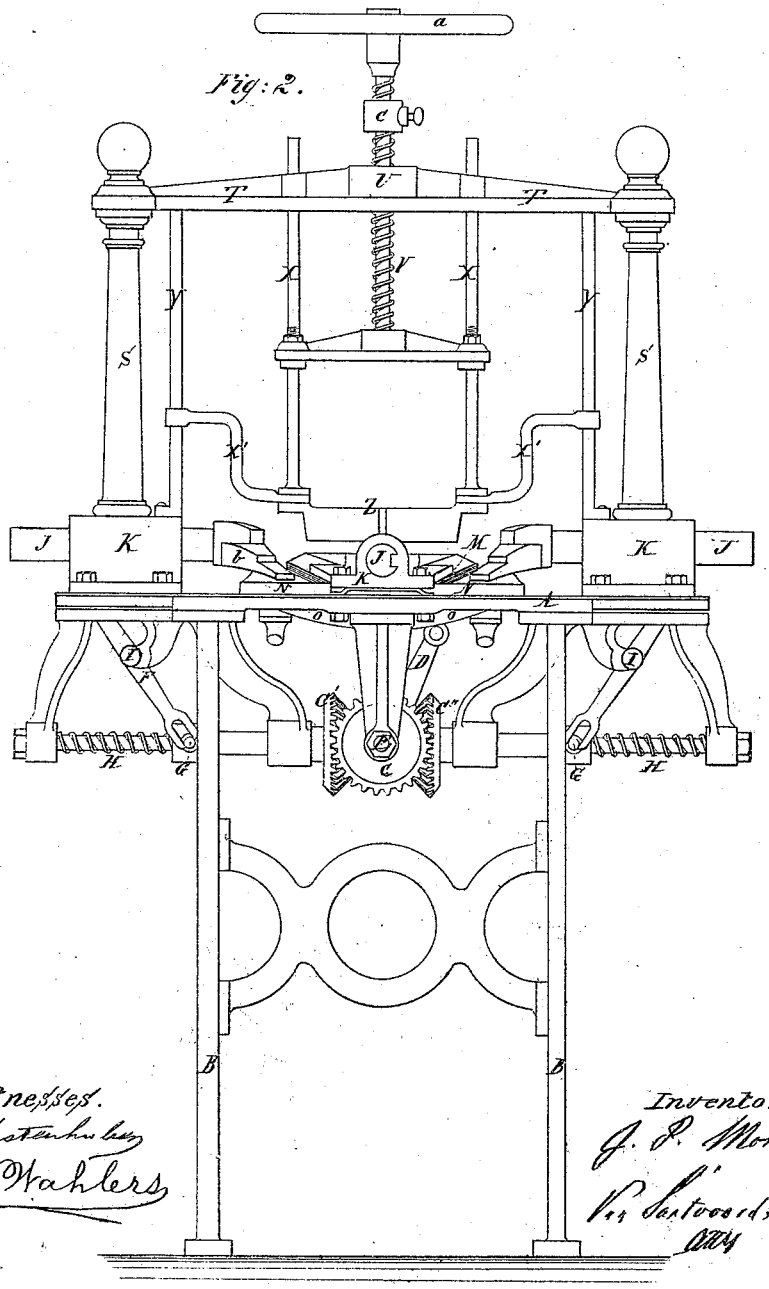

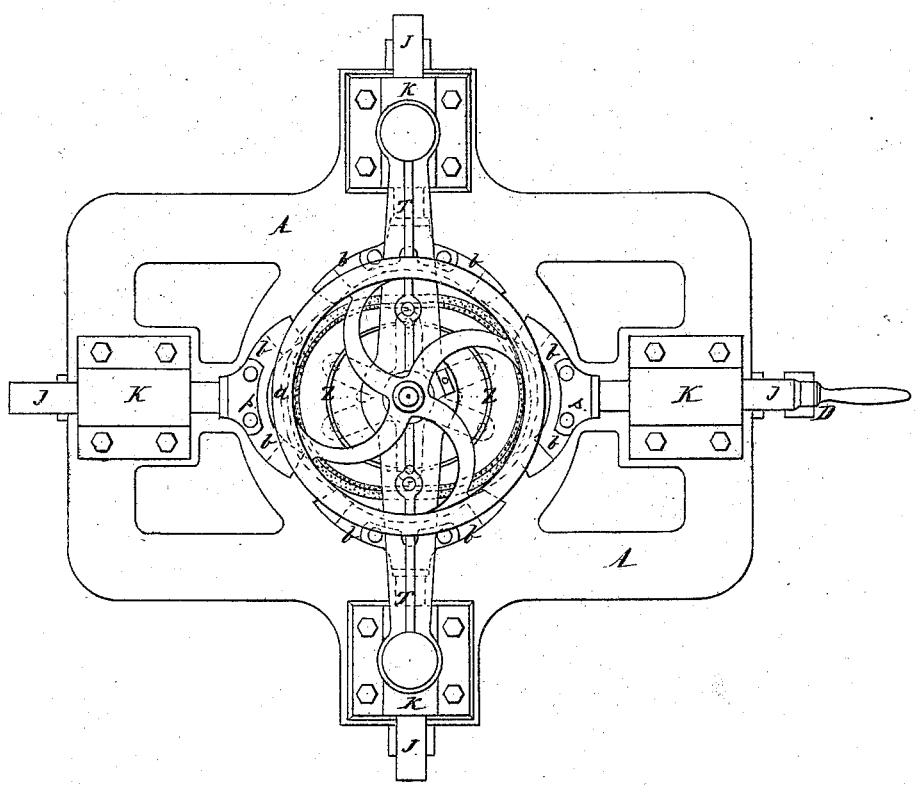

JEAN PROSPER MORLOT, OF PARIS, FRANCE.

Letters Patent No. 99,458, dated February 1, 1870.

IMPROVEMENT IN HAT-SHAPING MACHINES.

The Schedule referred to in these Letters Patent and making part of the same.

*To all whom it may concern:*

Be it known that I, JEAN PROSPER MORLOT, of the city of Paris, in the Empire of France, have invented a new and improved Machine for Shaping or Curling Hats; and I do hereby declare the following to be a full, clear, and exact description thereof, which will enable those skilled in the art to make and use the same, reference being had to the accompanying drawing, forming part of this specification, in which drawing—

Figure 1 is a side, and part sectional elevation;
Figure 2 is a front elevation; and
Figure 3 is a top view or plan of the said machine.
Similar letters indicate corresponding parts.

A is a cast-iron table, resting upon the stand or frame B. This table carries the whole mechanism, which is composed as follows:

C C' C" are three gear-wheels, to which motion is imparted by a crank, D.

The first gear-wheel C is mounted on the arbor E of the crank, and meshes into the two other gear-wheels, C' C".

The object of each of these latter is to impart motion in opposite directions to the levers F, by means of their nuts G, and the screws H, on the arbors of C' C"

The levers have their fulcra at I.

The screws are, respectively, right and left-handed, so that, by means of their nuts G, the levers act simultaneously, either in drawing nearer to or in receding from the centre of the apparatus.

The extremity of each lever is fastened in a cylindrical rod, J, which slides in guides K, fixed upon the table A by means of bolts or screws, and at right angles to each other around the forming-die.

The two guides, which are situated in line with the major axis of the brim to be formed, are disposed in suchwise, that the bolts, which retain them, may have room to play, to allow these slides slightly to oscillate from below upward, under the impulsion imparted on one side by the springs L, and on the other by the "matrix" or forming-die M.

The jaws or sectors b are disposed in order to turn down the rims of the hats. They are fastened with screws s, so as to allow of substituting others, according to the various shapes to be given to the hats.

A stationary mould, N, is fixed in the middle of the table, and in the lower part of this mould is a channel, O, which is made to communicate, by means of cocks, with a steam-generator.

The upper part of the mould N is perforated with little holes, for the escape of steam, which is introduced into the channel O from below.

P is a star or spider, with six arms, each carrying a stud, Q, which runs through the mould N.

This spider is acted on by a spring, R, which tends continually to cause it to rise.

S S are columns, supporting a cross-piece, T, at the centre of which is a nut, U, wherein moves a screw, V, which causes the rods X to ascend or descend.

The lower part of the rods X are secured to a ring, Z, and at the upper part of the screw V is fixed the hand-wheel *a*.

At *b* are the jaws, which serve to turn down the rim of the hat, as has already been stated.

*c* is a ring or collar, regulating the distance to which the hat-ring Z is to descend.

*d* is a gudgeon, serving to retain the hat-block in the centre of the apparatus.

*e* is a removable plate, carrying the form M.

*f* is a lever, turning on a fulcrum pin, *g*, and terminated at one end by a hook, *h*, and at the other by a handle, I'.

The object of this lever is to lower, at will, the spider P, to bring the movable plate *e* to the requisite height at which the hat must be placed before commencing the operation.

*k* is a blade, acting as a spring-catch, the object of which is to regulate the height to which the lever *f* is to be raised, and to retain it in the required position.

The following is the mode of operation of this apparatus:

The ring Z is raised, so that the hat can be placed under it. The lever *f* is lifted up until it rises over the spring-catch *k*. A ring, perforated with holes, corresponding with the holes of the mould N, is then placed on said mould. This ring is proportioned according to the size of the rim which is to be obtained. The hat is then placed upon the form or block, which is introduced upon the gudgeons *d*, and the forming-die M is passed over the hat, so as to rest upon the rim. When the hat is thus held, the cocks, which establish the communication with the steam-generator, are opened, and the steam is suffered to escape by the little holes in the mould N, and in through the ring.

The ring Z is lowered, by means of the hand-wheel *a*, until it lightly rests on the forming-die M.

When the part which is to be shaped is sufficiently softened, the supply of the steam is checked, the hand-wheel *a* is turned a second time, to cause the ring Z to rest upon the forming-die, and press the rim of the hat upon the mould, so as to raise it all round. In this operation, not only the resistance of the rim must be overcome, but also the resistance exerted from below upward, by the gudgeons Q, which run through the stationary mould, and act against the movable plate *e*.

The four jaws *b* are then worked, by means of the crank D, to cause them to draw nearer to the centre of the apparatus, and operate upon the edge of the rim of the hat, by flattening the part which has risen during the second pressure produced by the ring upon the forming-die. When the jaws have flattened the rim of the hat, they are released. The ring Z is then made to rise, and the finished hat, having been raised above the stationary mould, by the action of the spring R, on the gudgeons Q, is removed.

With this apparatus all sorts of hats, and hats of any size may be operated upon.

What I claim as new, and desire to secure by Letters Patent, is—

The gearings C C' C'', the crank D, the levers F, the nuts G, the screw H, the rods J, the guides K, the springs L, and the sectors $b$, operating in combination with the forming-die M, substantially as and for the purpose described.

J. P. MORLOT.

Witnesses:
C. CANAILLON,
F. OLCOTT.